United States Patent
Behme et al.

[11] Patent Number: 5,137,932
[45] Date of Patent: Aug. 11, 1992

[54] PROCESS FOR PRODUCING FOAMS

[75] Inventors: Klaus-Jürgen Behme, Eppstein/Taunus; Hans-Matthias Deger, Hofheim am Taunus, both of Fed. Rep. of Germany

[73] Assignee: Hoechst Aktiengesellschaft, Frankfurt am Main, Fed. Rep. of Germany

[21] Appl. No.: 622,839

[22] Filed: Dec. 5, 1990

[30] Foreign Application Priority Data

Dec. 7, 1989 [DE] Fed. Rep. of Germany ....... 3940447
Mar. 14, 1990 [DE] Fed. Rep. of Germany ....... 4008041

[51] Int. Cl.$^5$ .............................................. C08J 9/14
[52] U.S. Cl. ..................................... 521/131; 252/67; 252/68; 252/69; 521/98; 521/910
[58] Field of Search .................. 521/131, 98, 910; 252/67, 68, 69

[56] References Cited

U.S. PATENT DOCUMENTS

| | | | |
|---|---|---|---|
| 4,041,148 | 8/1977 | Simons et al. | 424/45 |
| 4,139,607 | 2/1979 | Simons et al. | 424/47 |
| 4,999,127 | 3/1991 | Merchant | 521/131 |
| 5,023,009 | 6/1991 | Merchant | 521/131 |
| 5,023,010 | 6/1991 | Merchant | 521/131 |

FOREIGN PATENT DOCUMENTS

| | | |
|---|---|---|
| 0077964 | 5/1983 | European Pat. Off. |
| 0334059 | 9/1989 | European Pat. Off. |
| 0416777 | 3/1991 | European Pat. Off. |
| 1111381 | 7/1961 | Fed. Rep. of Germany |
| 1193122 | 5/1970 | United Kingdom |
| 1209243 | 10/1970 | United Kingdom |

OTHER PUBLICATIONS

Kunststoff Handbuch, vol. VII, pp. 108, 190: 453–455 & 507–510 (1966).
Kirk–Othmer, *Encycl. of Chem. Tech*, 3rd ed. vol. 11:87–89 (1980).
Ullmanns Enzyklopedie, vol. 19, pp. 301–341 (1980).
Kirk–Othmer, *Encycl. of Chem. Tech*, 3rd Ed. vol. 23:576–607 (1983).
Kunststoff Handbuch, vol. VII, *Polyurethane*:246–331 (1983).

*Primary Examiner*—Morton Foelak

[57] ABSTRACT

The invention relates to a process for producing foams based on polyisocyanates by reacting polyisocyanates, compounds having at least two hydrogen atoms reactive towards isocyanate groups, blowing agents and, if appropriate, further additives. In this process, a blowing agent is used which is composed to the extent of at least 10 mol % of one or more fluorinated ethers of the formula $$C_aH_bF_c-O-C_dH_eF_f$$

where

| | |
|---|---|
| a = 1–6 | d = 1–2 |
| b = 1–12 | e = 0–5 |
| c = 1–12 | f = 0–5. |

9 Claims, No Drawings

PROCESS FOR PRODUCING FOAMS

The invention relates to a process for producing foams based on polyisocyanates, in particular polyurethane foams and polyisocyanurate foams. The production of such foams is known and has been described, for example, in Kunststoff-Handbuch [Plastics Handbook], Volume VII, Polyurethane [Polyurethanes], Carl Hanser Verlag, Munich, Vienna (1983), pages 246 to 331, and also in EP-A1-0,077,964, EP-A1-0,334,059 and German Auslegeschrift 1,694,138 (=British Patent 1,209,243).

In Ullmanns Enzyklopädie der technischen Chemie [Ullmann's Encyclopedia of Industrial Chemistry] (1980), Volume 19, pages 301 to 341, the raw materials which can be used and the possible processes for producing rigid polyurethane foams are described in summary.

Further relevant references can be found in Kirk-Othmer, Encycl. of Chem. Technology, 3rd edition, Volume 11 (1980), pages 87–89, and Volume 23 (1983), pages 576–607.

The usual blowing agents for polyurethanes are carbon dioxide—which is generated by addition of water during the production of the polyurethanes from polyisocyanates and compounds having reactive hydrogen——and/or so-called "physical blowing agents", namely readily volatile organic substances such as acetone, ethyl acetate, halogen-substituted alkanes such as methylene chloride, chloroform, ethylidene chloride, vinylidene chloride and dichlorodifluoromethane, and also butane, hexane, heptane or diethyl ether. The applicability of fluorinated hydrocarbons for producing heat-insulating polyurethane foams is known, for example, from German Patent 1,111,381. Inorganic blowing agents, for example air, $CO_2$ or $N_2O$, can also be used. Further details on the use of blowing agents are described in Kunststoff-Handbuch, [Plastics Handbook], Volume VII, Carl-Hanser-Verlag, Munich (1966), for example on pages 108 and 109, 453 to 455 and 507 to 510.

Physical blowing agents for polyurethane foams must meet certain demands. Good miscibility of the blowing agents with the usual raw materials is necessary, but they should be insoluble in the polyurethane being formed, in order to ensure good material quality of the foams. Furthermore, because of the heat of reaction which arises during foaming and can lead to a temperature rise up to about 200° C. when large-volume parts are foamed up, high thermal stability of the blowing agent is expected. In addition, the blowing agents will preferably be non-flammable. In the course of the development of polyurethane foam technology, all these demands led to the use of fluorinated chlorocarbons (CFC), especially trichlorofluoromethane (CFC 11), as physical blowing agents.

However, the CFCs are now suspected of damaging the ozone layer around the Earth. It is therefore necessary to dispense with the use of these compounds as soon as possible and, instead, to use other substances, which have no potential for ozone damage, as physical blowing agents.

The abandonment of CFCs as blowing agents in favor of $CO_2$ which—as mentioned above—is formed by addition of water during the production of polyurethanes from polyisocyanates, is under discussion. Although this method is acceptable for some foams, it causes great disadvantages, especially in the case of rigid foams, because the foams produced in this way have an increased thermal conductivity and hence a lower heat insulation capacity than the foams produced with the aid of CFCs.

Surprisingly, it has now been found that fluorinated ethers are suitable in the same way as CFCs for producing foams based on polyisocyanates and that the thermal conductivity of the rigid foams produced with them is substantially lower than that of those formed with $CO_2$. In particular, it has been found that these fluorinated ethers and $CO_2$ can be used simultaneously as blowing agents, a considerable improvement in the heat insulation effect being achieved even with a relatively small proportion of fluorinated ethers (and a correspondingly high $CO_2$ proportion and therefore a high water content in the rigid foam formulation).

The invention relates to a process for producing foams based on polyisocyanates by reacting polyisocyanates, compounds having at least two hydrogen atoms reactive towards isocyanate groups, blowing agents and, if appropriate, further additives, which comprises using a blowing agent which is composed to the extent of at least 10 mol % of one or more fluorinated ethers of the formula $$C_aH_bF_c\text{---}O\text{---}C_dH_eF_f$$

where

| | |
|---|---|
| a = 1–6 | d = 1–2 |
| b = 1–12 | e = 0–5 |
| c = 1–12 | f = 0–5. |

Preferably, at least 20 mol %, especially 50–80 mol %, of the blowing agent is composed of one or more of the said fluorinated ethers. However, the blowing agent can in principle also be composed of these ethers to the extent of 100 mol %. However, if—which in general will be the case—not all the blowing agent is composed of these ethers, then the remainder is composed of one of the abovementioned conventional blowing gases. Preferably, the remainder then is composed at least partially of $CO_2$, which is formed by addition of a suitable quantity of water during the reaction of the polyisocyanates to give the foams. A "suitable" quantity of water is here a quantity which forms the desired proportion of $CO_2$. Particularly preferred is a blowing gas which is composed only of one or more of the said ethers and $CO_2$ (formed by addition of water), i.e. that the "remainder", mentioned above, of the blowing gas is composed only of $CO_2$.

Amongst the fluorinated ethers of the formula I, those are preferred for which

| | |
|---|---|
| a = 1–5 | d = 1–2 |
| b = 1–6 | e = 1–3 |
| c = 5–10 | f = 2–4. |

Those are particularly preferred for which

| | |
|---|---|
| a = 1–3 | d = 1–2 |
| b = 1–4 | e = 1–3 |
| c = 1–6 | f = 2–4. |

The preparation of the fluorinated ethers is described in Ullmann's Encyclopedia of Industrial Chemistry, Volume A 11 (1988), pages 349-389, in particular page 367; A. M. Lovelace et al., Aliphatic Fluorine Compounds (1958); H. Liebig and K. Ulm, Herstellung und Anwendung aliphatischer Fluorverbindungen [Preparation and use of aliphatic fluorine compounds] II, Chemiker-Zeitung (1976), pages 3-13.

The invention also relates to foams which are based on polyisocyanates and which are obtainable by the above process.

When the said fluorinated ethers are used, the hitherto usual foam raw materials can be used and, as stated above, the proportions of water or conventional physical blowing agent can be greatly reduced or even eliminated altogether.

Polyisocyanates suitable for the process according to the invention are the aliphatic, cycloaliphatic and aromatic diisocyanates or polyisocyanates usual for this purpose. 2,4- and 2,6-toluyl diisocyanate, diphenylmethane diisocyanate, polymethylenepolyphenyl isocyanate and mixtures thereof are preferred. Polyisocyanates which contain carbodiimide groups, urethane groups, allophanate groups, isocyanurate groups, urea groups or biuret groups and which are termed "modified polyisocyanates" and "isocyanate prepolymers", can also be used.

The polyisocyanates are reacted with compounds which contain at least two hydrogen atoms reactive towards isocyanate groups, for example compounds containing hydroxyl groups and based on polyethers, polyesters and amines, and also compounds having amino groups and/or carboxyl groups and/or thiol groups. As a rule, these compounds have 2-8 hydrogen atoms reactive towards isocyanates.

The catalysts used in this reaction are, as usual, tertiary amines which, if desired, can also contain hydrogen atoms active towards isocyanate groups, and/or organic metal compounds, preferably tin salts of carboxylic acids.

In addition, surface-active additives such as emulsifiers and foam stabilizers are in general also used. The emulsifiers are, for example, salts of fatty acids. Polyethersiloxanes are frequently used as foam stabilizers.

Examples 1-7 which follow explain the invention. They relate to typical rigid foam formulations with different proportions of various fluorinated ethers. In the comparison example, however, exclusively $CO_2$ formed from water is used as the blowing agent. When the fluorinated ethers according to the invention are also used in addition to $CO_2$, a marked reduction in the thermal conductivity of the foams is found even at relatively small ether proportions of, for example, 25 mol %, relative to the total quantity of blowing agent. This effect even increases on prolonged storage.

The fluorinated ethers are also suitable for foaming up flexible foams having an open-cell structure and for producing foam moldings having a porous core and a compact skin, according to German Auslegeschrift 1,694,138 (corresponding to British Patent 1,209,243).

The properties of the foams produced in the examples which follow are indicated in the table after the examples.

COMPARISON EXAMPLE (use of $CO_2$ as the sole blowing agent)

85 g of sucrose/propylene oxide polyether of OH number 380, 15 g of ethylenediamine/propylene oxide polyether of OH number 480, 1 g of foam stabilizer (type DC 193 from Dow Corning Corp.), 1.5 g of dimethylcyclohexylamine and 3.8 g of water were intimately mixed for 15 seconds by means of a stirrer at 2500 revolutions, then intimately mixed for 10 seconds with 192 g of crude diphenylmethane diisocyanate (MDI of usual commercial quality) and subsequently cast into a paper mold. Foaming of the mixture started after about 15 seconds and was complete after about 75 seconds. This gave a rigid foam having the properties indicated in the table.

EXAMPLE 1

The procedure of the comparison example was followed, but with the difference that 2.0 g of dimethylcyclohexylamine, 2.0 g of water, 15 g of 1-hydro-tetrafluoroethyl methyl ether ($CHF_2$—$CF_2$—O—$CH_3$) and 165 g of MDI were used.

EXAMPLE 2

The procedure of Example 1 was followed, but the proportion of water was increased to 3.0 g and the proportion of MDI was increased to 180 g, and the 15 g of 1-hydrotetrafluoroethyl methyl ether were replaced by 10 g of 2-hydrohexafluoropropyl methyl ether ($CF_3$—CHF—$CF_2$—O—$CH_3$).

EXAMPLE 3

The procedure of Example 2 was followed, but the proportion of water was increased to 3.4 g and the proportion of MDI was increased to 186 g. Instead of 2-hydrohexafluoropropyl methyl ether, 4.5 g of 1-hydrotetrafluoroethyl ethyl ether ($CHF_2$—$CF_2$—O—$CH_2$—$CH_3$) were used.

EXAMPLE 4

15 g of qlycerol/ethylene oxide polyether of OH number 750, 50 g of sucrose/propylene oxide polyether of OH number 490, 15 g of ethylene diamine/propylene oxide polyether of OH number 480, 20 g of tetrabromophthalate diol of OH number 220 (PHT-4-diol from Great Lakes Chemical), 20 g of trichloroethyl phosphate, 1 g of foam stabilizer, 1.5 g of dimethylcyclohexylamine, 1 g of water, 28 g of 1-hydro-tetrafluoroethyl methyl ether ($CHF_2$—$CF_2$—)—$CH_3$) and 147 g of MDI were foamed up as in the comparison example.

EXAMPLE 5

The procedure of Example 4 was followed, but instead of 15 g only 10 g of glycerol/ethylene oxide polyether of OH number 750 and 55 g of sorbitol/glycerol/propylene oxide polyether of OH number 560 were used instead of 50 g of sucrose/propylene oxide polyether of OH number 490, and the 1-hydrotetrafluoroethyl methyl ether blowing agent was replaced by 40 g of 1,1-difluoro-2,2-difluoroethyl 1,1,1-trifluoroethyl ether ($CHF_2$—$CF_2$—O—$CH_2$—$CF_3$).

EXAMPLE 6

15 g of a polyether obtained from ethylenediamine and equal proportions of ethylene oxide and propylene oxide and having an OH number of 630 were, as in Example 1, mixed and foamed up with 45 g of sorbitol/glycerol/propylene oxide polyether of OH number 560, 20 g of glycerol/propylene oxide polyether of OH number 160, 20 g of tetrabromophthalate diol of OH number 220 and 20 g of trichloroethyl phosphate as well as 1.0 g of foam stabilizer, 1.0 g of dimethylcyclohexylamine, 2.2 g of water, 13 g of 1,1-difluoro-2,2-difluoroethyl ethyl ether ($CHF_2$—$CF_2$—O—$CH_2$—$CH_3$) and 137 g of MDI.

EXAMPLE 7

The procedure of Example 4 was followed, but the 28 g of 1-hydrotetrafluoroethyl methyl ether were replaced by 35 g of 1,1,1-trifluoro-2-fluoro-3,3-difluoropropyl methyl ether ($CF_2$—CHF—$CF_2$—O—$CH_3$).

TABLE

| | | Properties of the foam | |
|---|---|---|---|
| | Water/fluorinated ether molar ratio | Bulk density (kg/$m^3$) | Thermal conductivity (23° C., mW/(m × K)) |
| | | | after 1 day / after 6 weeks |
| Comparison example | 100/0 | 37 | 25.8 / 34.7 |
| Example 1 | 49/51 | 36 | 23.0 / 26.4 |
| Example 2 | 75/25 | 37 | 22.8 / 26.4 |
| Example 3 | 86/14 | 34 | 23.9 / 29.0 |
| Example 4 | 21/79 | 32 | 22.1 / 23.8 |
| Example 5 | 22/78 | 26 | 21.0 / 21.9 |
| Example 6 | 58/42 | 32 | 23.1 / 26.3 |
| Example 7 | 22/78 | 35 | 21.3 / 22.1 |

What is claimed is:

1. A process for producing foams based on polyisocyanates by reacting polyisocyanates, compounds having at least two hydrogen atoms reactive towards isocyanate groups, blowing agents and optionally, further additives, which comprises using a blowing agent which is composed to the extent of at least 10 mol % of one or more fluorinated ethers of the formula I $$C_aH_bF_c\text{—}O\text{—}C_dH_eF_f$$

where

| a = 1-6 | d = 1-2 |
|---|---|
| b = 1-12 | e = 0-5 |
| c = 1-12 | f = 0-5. |

2. The process as claimed in claim 1, wherein a blowing agent is used which is comprised to the extent of at least 20 mol % of one or more of the said fluorinated ethers.

3. The process as claimed in claim 1, wherein a blowing agent is used which is comprised to the extent of 50-80 mol % of one or more of the said fluorinated ethers.

4. The process as claimed in claim 1, wherein the remainder of the blowing agent is comprised at least partially of $CO_2$ which is formed by addition of water during the reaction of the polyisocyanates.

5. The process as claimed in claim 1, wherein the remainder of the blowing agent is consisting essentially of $CO_2$ which is formed by addition of water during the reaction of the polyisocyanates.

6. The process as claimed in claim 1, wherein one or more fluorinated ethers of the formula I where

| a = 1-5 | d = 1-2 |
|---|---|
| b = 1-6 | e = 1-3 |
| c = 5-10 | f = 2-4 |

7. The process as claimed in claim 1, wherein one or more fluorinated ethers of the formula I where

| a = 1-3 | d = 1-2 |
|---|---|
| b = 1-4 | e = 1-3 |
| c = 1-6 | f = 2-4 | are used.

8. The process as claimed in claim 1, wherein the blowing agent is non-flammable.

9. A process for producing a polyisocyanate-derived foam by reacting the components comprising a polyisocyanate and a compound having at least two hydrogen atoms reactive toward isocyanate groups, the reaction between said components being accompanied by a blowing step with the aid of a blowing agent comprising at least 10 mol % of one or more fluorinated ethers of formula I $$C_aH_bF_c\text{—}O\text{—}C_dH_eF_f$$

where

| a = 1-6 | d = 1-2 |
|---|---|
| b = 1-12 | e = 0-5 |
| c = 1-12 | f = 0-5. |

* * * * *